United States Patent [19]

Smith

[11] 4,010,855
[45] Mar. 8, 1977

[54] WAREHOUSE SYSTEM WITH PAN TRANSFER APPARATUS

[75] Inventor: Joseph F. Smith, Freckleton near Preston, England

[73] Assignee: Litton Systems, Inc., Beverly Hills, Calif.

[22] Filed: Feb. 27, 1975

[21] Appl. No.: 553,537

[52] U.S. Cl. .................. 214/16.4 A; 214/16.1 DB; 214/95 R; 214/730
[51] Int. Cl.² ...................................... B65G 47/00
[58] Field of Search ............. 214/16.1 D, 16.1 DB, 214/16.4 R, 16.4 A, 730, 16.6, 95 R

[56] References Cited
UNITED STATES PATENTS

| | | | |
|---|---|---|---|
| 1,828,307 | 10/1931 | Been | 214/16.1 DB |
| 2,663,434 | 12/1953 | Pierce | 214/16.6 |
| 2,707,666 | 5/1955 | Becker | 214/16.4 A X |
| 2,940,068 | 6/1960 | Stiefel | 214/16.4 A X |
| 3,297,379 | 1/1967 | Artoud et al. | 214/16.4 A X |
| 3,432,045 | 3/1969 | Bauer | 214/16.4 R |
| 3,473,675 | 10/1969 | Goldamoner et al. | 214/16.4 A |
| 3,547,282 | 12/1970 | Hartbauer et al. | 214/16.4 A |
| 3,809,259 | 5/1974 | Pipes | 214/16.4 A |
| 3,883,008 | 5/1975 | Castaldi | 214/16.4 A |

FOREIGN PATENTS OR APPLICATIONS

| | | | |
|---|---|---|---|
| 763,375 | 12/1956 | United Kingdom | 214/16.6 |
| 1,051,879 | 12/1966 | United Kingdom | 214/16.4 A |

*Primary Examiner*—Robert J. Spar
*Assistant Examiner*—R. B. Johnson
*Attorney, Agent, or Firm*—Robert M. Vargo; Walter R. Thiel

[57] ABSTRACT

A shuttle assembly for use on a computer operated crane in an automated warehouse system. The crane has an elevatable platform and is movable along an aisle with horizontal storage racks on each side of the aisle. The racks include a plurality of vertical storage compartments. A shuttle assembly is mounted on the elevatable platform and comprises pins of two different heights carried on each of two adjacent counter rotating chains positioned on the bed of the elevated platform for pulling storage pans onto or pushing off the shuttle on computer command. Angle supports are included and are positioned one above each chain for supporting and guiding the pans while on the shuttle. An improved unitary material handling pallet or pan is provided for cooperation with the shuttle.

5 Claims, 10 Drawing Figures

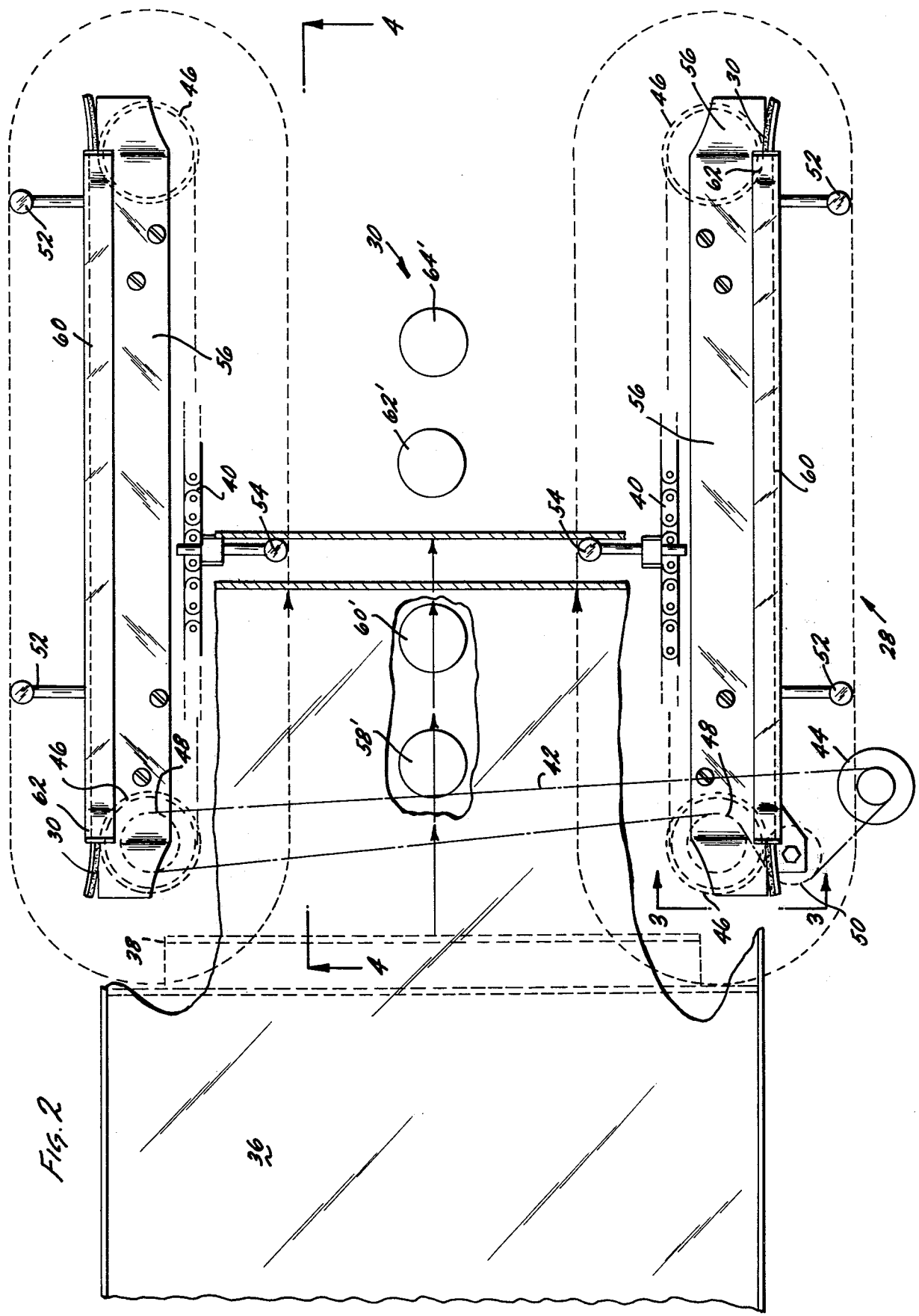

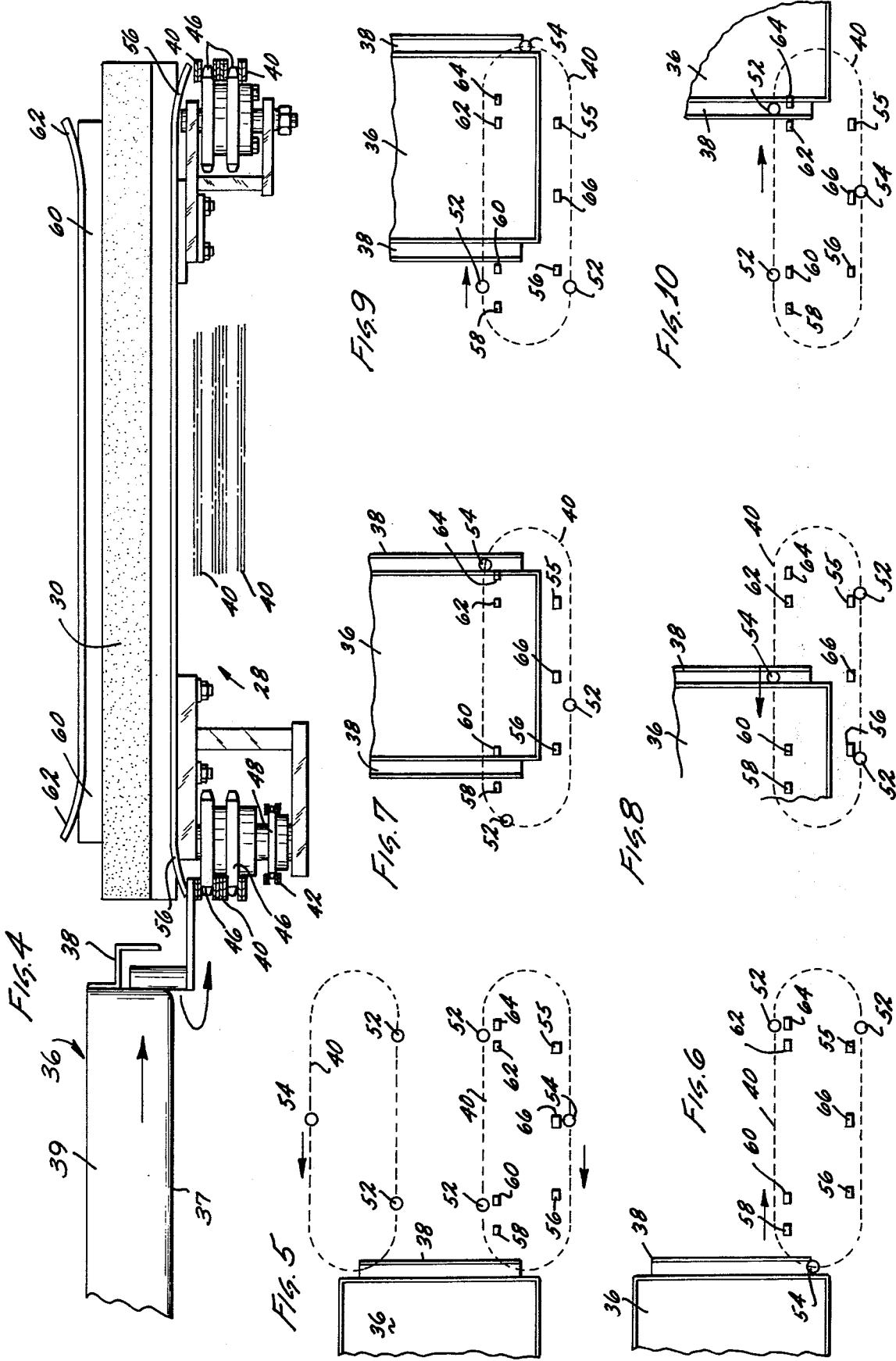

WAREHOUSE SYSTEM WITH PAN TRANSFER APPARATUS

BACKGROUND OF THE INVENTION

The presently existing shuttles for automated warehouse cranes have various deficiencies.

One shuttle concept utilizes a magnetic means to latch onto material handling pallet or pan for loading and offloading. This concept is undesirable for several reasons. If the weight of the load is greater than the holding strength of the magnets then the material cannot be moved. To increase the weight capabilities of this type of shuttle latch it would be required to construct the unit with excessive mass thereby limiting the support structure height to stiffen the crane, tracks and etc. Another problem exists; only items that can be stored are items not adversely affected by the magnets.

Another commonly known shuttle concept utilizes a horizontal deflecting hook or rod which extends toward the material handling pallet or pan then rotates 90° to catch a lip on the handling means. This concept is further limited in the amount of weight it can handle due to the sensitive nature of its operating mechanism as well as the construction of its pallets or pan material handling means, namely, the handling means comprises a separate material holding portion and a lip portion for engagement of the deflecting hook or rod that is separate and generally attached to the holding portion by welding or bolting that fails after prolonged use.

Still another shuttle concept utilizes spaced apart successively operable pairs of pins to sequentially move the material handling container on or off the shuttle. This concept like the others mentioned is considerably complicated in operation and construction which results in considerable down time for repair and synchronization.

These and various other problems were not satisfactorily resolved until the emergence of the instant invention.

SUMMARY OF THE INVENTION

In accordance with the instant invention there is provided an improved shuttle and material handling means combination that has improved light weight construction, is strong, positive acting, requires low maintenance and is mechanically simple to construct.

The foregoing and other features of this invention will become more fully apparent from the following detailed description with reference to the accompanying drawings.

BRIEF DESCRIPTION OF THE DRAWINGS

FIG. 2 is a partial cutaway plan view of the shuttle taken along lines 2—2 of FIG. 1.

FIG. 4 is a partial cutaway view of the shuttle taken along line 4—4 of FIG. 2.

FIGS. 5-10 are partial schematic showings of the various operational position of the pins for loading and off loading the material from the shuttle.

DETAILED DESCRIPTION OF THE PREFERRED EMBODIMENTS OF THE INVENTION

The invention pertains to an improved shuttle and materialing container for an automated warehouse.

Figure 1:
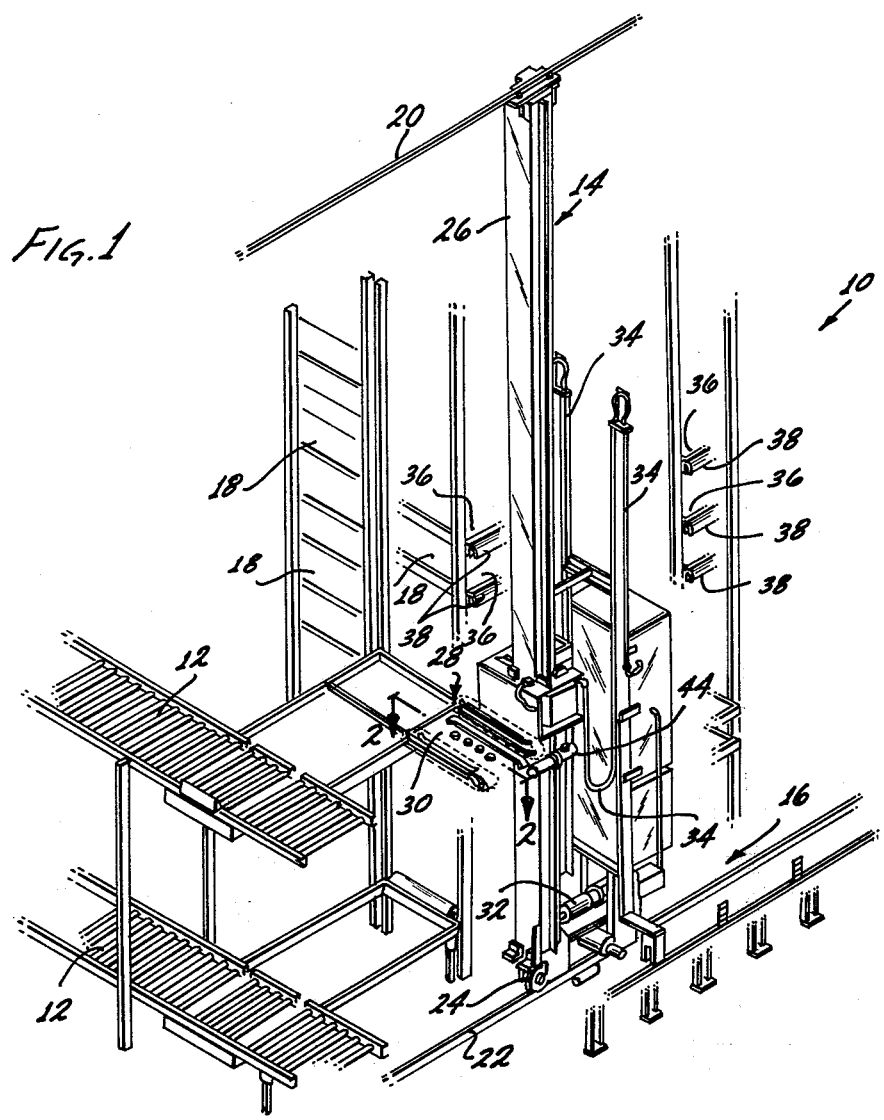
FIG. 1 is a perspective view of a typical automated warehouse having vertical storage racks along a horizontal isle serviced by a computer controlled crane that has an elevatable platform employing a material handling shuttle.

FIG. 1 is a perspective showing of an automated warehouse 10. Material to be on loaded or off loaded arrives at or departs from the storage area via conventional roller conveyor means 12. A stacker crane 14 is movable by computer command (not shown) along a horizontal aisle 16 between rows of vertical storage compartments 18, one shown, for servicing any one of the storage compartments 18. The crane 14 is supported and guided by an upper rail 20 and a lower rail 22. The weight of the crane and material is supported by rollers 24 (one shown) which have rolling engagement with rail 22. The crane 14 is movable along the rails by electric motor 25.

The crane 14 comprises a vertical column 26 positioned between rails 20 and 22. Positioned on column 26 is a material handling platform 28 that supports a material handling shuttle 30. The platform 28 is movable along substantially the entire length of column 26 by an electric motor 32.

The electric power for the motors and shuttle, hereinafter discussed in detail, are supplied from sliding brush contact, (not shown), a well known electrical power pickup, through electric cables 34. The power to all motors including the shuttle motor is controlled by a general all purpose computer remotely located, not shown, in a conventional manner well known in the automated warehouse art.

Material handling pans 36 having a base and integrated side portions 37, 39 respectively are shown in various storage compartments 18. On the front and rear side portions of the handling pans 36 are lips 38 for shuttle engagement, see the various figs. The pan and lip are made from a single piece of material so as to form a rigid unitized structure.

Figure 3:
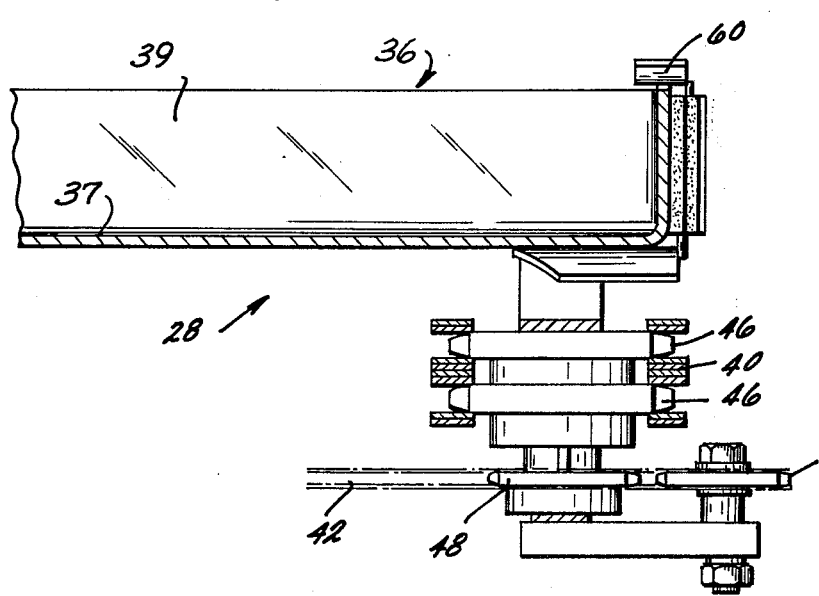
FIG. 3 is a partial cutaway view of the shuttle taken along line 3—3 of FIG. 2.

Referring now to FIGS. 2, 3, and 4, the upper surface of platform 28 comprising the shuttle 30 and a portion of material handling pan 36 includes lip of rim 38. Each shuttle assembly includes a pair of driven chains 40 and a drive chain 42. The driven chains 40 are driven and synchronized by driving chain 42. Chain 42 is driven by motor 44, see FIG. 1, by conventional gear means. The driven chains 40 can either be single or double, as shown, and are carried by a sprockets 46 having conventional bearings about their pivot shafts. The driving chain 42 drives the chains 40 through drive sprockets 48 attached to sprockets 46. An idler sprocket 50 is provided to take up the excess slack in the length of chain 42. The pair of driven chains 40 on the shuttle rotate in opposite directions. Fixedly positioned on each driven chain 40 are two short pins 52 and a long pin 54. These pins are positioned perpendicular to the plane of the chains and protrude from the upper surface of the platform 28. The purpose of these pins is hereinafter discussed. A bracket 56 is provided above and adjacent each driven chain assembly for support of material handling pan 36 while it is positioned on the shuttle. The end portions 58 of brackets 56 the aisles are formed downward to provide ease of movement of the pan 36 on and off the brackets. An inward facing lip 60 is provided on each bracket 56 to prevent the material handling pan from inadvertently tipping up on one end and then falling into the open area between the brackets. The upward flair 62 of bracket 60 allows for the tipped condition of pan 36 as it rides over bracket edge 56 when leaving or entering the shuttle.

OPERATION OF THE PREFERRED EMBODIMENT

Referring now to FIG. 5, the two driven chains 40 are shown in their stowed or ready position. Pins 52 and 54 respectively of the opposing chains 40 are positioned 180° from one another; that is, long pins 54 are positioned on the outside chain loop at the center and the short pins 52 are positioned opposite one another on the inside loops of the opposing chains 40. A pan 36 with lip 38 is shown on the left side of the shuttle.

The driven chains 40 operate in the same manner except for the opposite direction of rotation, therefore, for ease of explanation, only the operation of the lower chain 40 which includes switch functions will be explained for typical operation.

The first operation, as shown by FIG. 6 and 7, is the picking up of a pan 36 from the left side of the storage area, returning the pan to the roller lower conveyor 12 and depositing the pan 36 on the left hand side thereof.

The stacker crane 14, operated by computer control, leaves the roller conveyor 12 area for a storage compartment 18 selected on the left hand side of aisle 16. The shuttle has the pins 52 and 54 positioned in the stowed FIG. 5 position. When the crane 14 reaches the selected storage area 18 it stops its longitudinal movement along isle 16 and the platform 28 positions the shuttle in place in front of the storage area, the longitudinal and vertical movement may be simultaneous. The lower chain 40 now moves counter clockwise while upper chain 40 moves clockwise until pin 54 passes over switch 55 which reverses the direction of the chains. While moving in the counter clockwise direction a short pin 52 nearest the pan pushes against the pan insuring a proper placement of the pan in the storage compartment. The lower pin 54 now moving in a clockwise direction from its switch 55 position activates switch 56 (no action required from this switch 56 at this time) and engages lip 38 of pan 36 and continues moving counter clockwise activating switches 58, 60 and 62 (no action by switches required) until the pan 36 activates switch 64 which shuts off drive motor 44. Switch 60 is placed so that in the event of the pan 36 overshooting the end of the shuttle, the switch is returned to a position that indicates an "overhang" condition and disables the stacker crane in all operational directions. The passing of the pin 54 over switch 58 and 60 has a further purpose of instructing the computer the direction from which the pan 36 was received on the shuttle 30.

For the next operation of the shuttle assume correct pan 36 location on shuttle 30 as shown in FIG. 7.

Referring now to FIG. 8, the stacker crane 14 returns to roller conveyor area by computer control and for a normal unload the pan 36 will be placed on the left hand side (i.e., the same side that it was picked up from in the storage area). The long pin 54 moves counter clockwise pushing the pan 36 over into the left hand receiving area, and continue moving counter clockwise activating switch 56 (no action required) until the pin 54 activates switch 66 shutting off drive motor 44. The activating of switch 58 by pin 54 is also a no action function. The pins 52 and 54 are now again in their FIG. 5 stowed position When it is required to pick up a pan 36 from a storage compartment 18 on the left hand side of aisle 16, returning to the conveyor and depositing the pan 36 on the right hand side of isle 16 the following sequence of movement of lower chain 40 occurs. The crane 14 leaves the roller conveyor area by computer control to a selected storage compartment 18. The pins 52, 54 are in their stowed condition. Lower chain 40 now moves in the clockwise direction from its stowed position, passes over switch 56 (no action required from the switch at this time) and engages the lip 38 of pan 36 and continues moving clockwise pulling the pan 36 over switches 58, 60, and 62 (no action required) until the bin comes into contact with switch 64 which shuts off motor 44. The pan being now correctly placed on the shuttle, the crane 14 returns to the roller conveyor area. When the correct off load position is reached by the crane 14, the pin 54 moves clockwise pushing the bin further over to the right and starts to disengage from lip 38 of the pan 36 at the point when pin 54 is just clear of the pan lip, one of the pins 52 is at the rear of the pan just below the outer portion of lip 38 and will continue to push the pan over to the right hand side. The pin 52 moves far enough around the arc of travel to ensure that the pan is fully over to the right hand side and that pin 54 passed over switch 55 and 66 (no action required) on contact with switch 56 the drive motor 44 is stopped and reversed from in a counter clockwise direction until pin 52 contacts switch 54 shutting off drive motor 44.

It should be noted that the two short pins 52 are used in exactly the same manner depending on the direction of pan travel on and off the shuttle.

The switches have the following functions: switches 60, 62 and 64 indicate direction of pan travel from left to right and ensure proper positioning of the pan 36 on shuttle 30. Each switch changes state from binary 0 to a binary 1 when the pin 54 has contact. A binary 111, one from each switch in sequence, is required to ensure proper positioning of the pan on the shuttle which in turn allows the crane 14 to again move down isle 16. Switches 62, 60 and 58 serve the same function when the pan 36 is being moved from right to left.

Switches 54, 55 and 56 cause the shuttle chains 40 to cease movement or reverse direction of travel as hereinbefore explained.

The switches 58', 60', 62' and 64' of FIG. 2 have the same function of their corresponding switch 58, 60, 62 and 64 but are of the proximity type that require no physical contact with the long pin 54 but are activated by the metal pan 36 passing over.

The invention may be embodied in other specific forms without departing from the spirit or essential characteristics thereof. The present embodiment are, therefore, to be considered in all aspects as illustrative and not restrictive. The scope of the invention being indicated by the appended claims rather than by the foregoing description and all changes which come within the meaning and range of equivalency of these claims are, therefore, intended to be embraced therein.

What is claimed and desired to be secured by U.S. Letters Patent is:

1. In a warehouse system an operable shuttle, said shuttle having an elevatable platform and movable along an aisle with horizontal storage racks on each side thereof, said racks including a plurality of vertical storage compartments therealong comprising:

a plurality of storage pans of unitized construction for containing storable material, each of said pans having an integrated base and side walls with an engagable lip formed on each of said side walls adjacent the aisles;

means carried by said elevatable platform for engaging said lip for pulling one of said plurality of storage pans from a selected location on one side of said aisle toward and onto said elevatable platform and for engaging one of said side walls at a position below said lip for pushing said one of said plurality of storage pans to the center of said elevatable platform and for pushing said pan from said center of said elevatable platform to a selected location on either side of said aisle; and said means carried by said elevatable platform comprises a pair of side by side counter rotating chains movable in a common horizontal plane each having one lip engaging pin for pulling and two substantially shorter pins for pushing said pans from said elevatable platform, the axes of rotation of said chains being substantially parallel with said pins and vertical storage compartments, said elevatable platform including a pair of angle supports having their aisle ends downward sloping for supporting and guiding said one of said plurality of pans while on said shuttle and said pins movable in an endless horizontal path around said supports.

2. The invention of claim 1, wherein each one of said counter-rotating chains is positioned under one of said angle supports.

3. The invention of claim 1, wherein said means further comprises a third rotating chain driven by a motor for driving said counter-rotating chains in synchronization.

4. The invention of claim 3, wherein switching means are provided for detecting direction of movement of said pan, detecting an overhang of said pan on said elevator, for reversing the direction of said motor, and for stopping said motor in a correct position.

5. The invention of claim 4, wherein an inward facing flange with upward sloping aisle ends positioned on the uppermost surface of each of said angle supports to prevent said storage pans from tipping off of said angle support during pan movement.

* * * * *